(12) United States Patent
Anderson

(10) Patent No.: US 7,772,557 B2
(45) Date of Patent: Aug. 10, 2010

(54) OFFSET COMPENSATION SCHEDULING ALGORITHM FOR INFRARED IMAGERS

(75) Inventor: Shane M. Anderson, Minneapolis, MN (US)

(73) Assignee: Fluke Corporation, Everett, WA (US)

(*) Notice: Subject to any disclaimer, the term of this patent is extended or adjusted under 35 U.S.C. 154(b) by 316 days.

(21) Appl. No.: 12/054,818

(22) Filed: Mar. 25, 2008

(65) Prior Publication Data

US 2008/0302956 A1 Dec. 11, 2008

Related U.S. Application Data

(60) Provisional application No. 60/908,930, filed on Mar. 29, 2007.

(51) Int. Cl.
*G01J 5/02* (2006.01)
*G12B 13/00* (2006.01)
*G01D 18/00* (2006.01)

(52) U.S. Cl. .............................. 250/339.09; 250/252.1; 250/338.1; 250/341.5

(58) Field of Classification Search .............. 250/252.1, 250/338.1, 339.01, 339.06, 339.09, 341.5
See application file for complete search history.

(56) References Cited

U.S. PATENT DOCUMENTS

| 6,023,061 | A | 2/2000 | Bodkin |
| 6,353,223 | B1* | 3/2002 | Ookawa ..................... 250/330 |
| 6,353,233 | B1 | 3/2002 | Ookawa |
| 6,879,923 | B2* | 4/2005 | Butler .......................... 702/104 |
| 7,638,760 | B1* | 12/2009 | Heipp et al. .............. 250/252.1 |
| 2001/0040216 | A1* | 11/2001 | Knauth et al. ............... 250/352 |
| 2003/0160171 | A1* | 8/2003 | Parrish et al. ............ 250/338.1 |
| 2006/0279632 | A1* | 12/2006 | Anderson ................... 348/164 |
| 2008/0099683 | A1* | 5/2008 | Schmidt et al. ............. 250/353 |
| 2009/0273675 | A1* | 11/2009 | Jonsson ...................... 348/164 |

* cited by examiner

*Primary Examiner*—David P Porta
*Assistant Examiner*—Casey Bryant
(74) *Attorney, Agent, or Firm*—Fredrickson & Byron, P.A.

(57) ABSTRACT

A method of scheduling offset compensation for an infrared (IR) imaging system to maintain good image quality. The method includes a scheduling algorithm for automatic offset compensation. The scheduling algorithm automatically adjusts periods between offset compensations based on the measurement of drift of the focal plane array (FPA) pixel levels. As a result, the periods are adjusted both when the camera is thermally stable and when the camera is undergoing an internal thermal change.

29 Claims, 3 Drawing Sheets

OFFSET COMPENSATION SCHEDULING ALGORITHM FOR INFRARED IMAGERS

PRIORITY CLAIM

The present application claims priority to provisional application Ser. No. 60/908,930, entitled OFFSET COMPENSATION SCHEDULING ALGORITHM FOR INFRARED CAMERAS filed on Mar. 29, 2007, which is incorporated by reference in its entirety herein.

TECHNICAL FIELD

Embodiments of the present invention pertain to infrared imaging systems and, more particularly, to infrared cameras having offset compensation functionality.

BACKGROUND

As is known, infrared cameras generally employ a lens working with a corresponding infrared focal plane array (FPA) to provide an image of a view in a particular axis. The operation of such cameras is generally as follows. Infrared energy is accepted via infrared optics, including the lens, and directed onto the FPA of microbolometer infrared detector elements or pixels. Each pixel responds to the heat energy received by changing its resistance value. An infrared (or thermal) image can be formed by measuring the pixels' resistances—via applying a voltage to the pixels and measuring the resulting currents or applying current to the pixels and measuring the resulting voltages. A frame of image data may, for example, be generated by scanning all the rows and columns of the FPA. A dynamic thermal image (i.e., a video representation) can be generated by repeatedly scanning the FPA to form successive frames of data. Successive frames of thermal image data are generated by repeatedly scanning the rows of the FPA; such frames are produced at a rate sufficient to generate a video representation of the thermal image data.

Individual pixels have unique response characteristics. These non-uniformities often result in fixed pattern noise. Many infrared cameras have functionality to provide the ability to correct for this. For example, some infrared cameras can automatically or manually perform offset compensation, which corrects for variations in the individual pixel responses by observing a uniform thermal scene (e.g., by placing a shutter between the optics and the array) and measuring offset correction data for each pixel which provides the desired uniform output response. These measured offset corrections are stored, then later applied in subsequent infrared measurements (e.g., with the shutter open) to correct for fixed pattern noise. Other compensations can also be applied, such as 2-point correction.

As is known, offset compensation functionality is found in most conventional infrared cameras because it leads to improved imaging capabilities. However, offset compensation can be an inconvenience to the user as it necessitates activation of the camera shutter, thereby "freezing" the camera image for a short period of time when the shutter is closed. Therefore, it is desirable to keep the period between offset compensations lengthy so as to limit the general inconvenience to the user of the camera, while still maintaining good image quality.

Temperature changes within or surrounding an infrared camera are found to result in the individual pixels further exhibiting their unique response characteristics. In particular, the change in temperature of the camera's internal components, e.g., due to self-heating or as the result of changes to the surrounding ambient temperature, leads to the individual pixels exhibiting fixed pattern noise over extended lengths of time. For example, during initial powering of an infrared camera, the internal components can be found to continue to rise in temperature for a period of time before the camera becomes thermally stable. Because of this, offset compensation is often performed at an increased frequency during such period so as to maintain good image quality from the camera. Such increased frequency of offset compensation correspondingly results in an increased frequency of shutter actuation. Consequently, there is further inconvenience for the user as the shutter is closed more often during such period.

What are needed are apparatus and systematic methods to address or overcome one or more of the limitations briefly described above with respect to offset compensation functionality in infrared imaging systems.

SUMMARY

Embodiments of the invention involve an infrared imaging system having offset compensation functionality to maintain good image quality from the system. The system includes offset compensation that implements a scheduling algorithm. In use, the scheduling algorithm automatically adjusts periods between shutter actuations of the camera based on drift of the focal plane array (FPA) pixel levels. In some embodiments, the periods between shutter actuations are also based on a prediction of when offset compensation would be desirable. As a result, the periods are adjusted both when the camera is thermally stable and when the camera is undergoing thermal change.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention. In the foregoing detailed description, the invention has been described with reference to specific embodiments. However, it may be appreciated that various modifications and changes can be made without departing from the scope of the invention as set forth in the appended claims.

As described above, infrared imaging systems, e.g., infrared cameras, are generally configured with offset compensation functionality in order to maintain good image quality of their internal image processing systems. When performed, offset compensation corrects non-uniformities from the individual pixels of the focal plane arrays (FPAs) in the imaging systems. One limitation that has been found with respect to such offset compensation is its high frequency of use, particularly when internal components of the imaging systems are found to exhibit thermal change. For example, as described above, such thermal change can result during initial powering of the imaging system or result from shift in ambient temperature surrounding the imaging system. As further described above, because high frequency of offset compensation correspondingly results in high frequency of shutter actuation, this can inconvenience the user as the image provided by the infrared imaging system is often frozen for a short period time when the shutter is closed.

Figure 1:
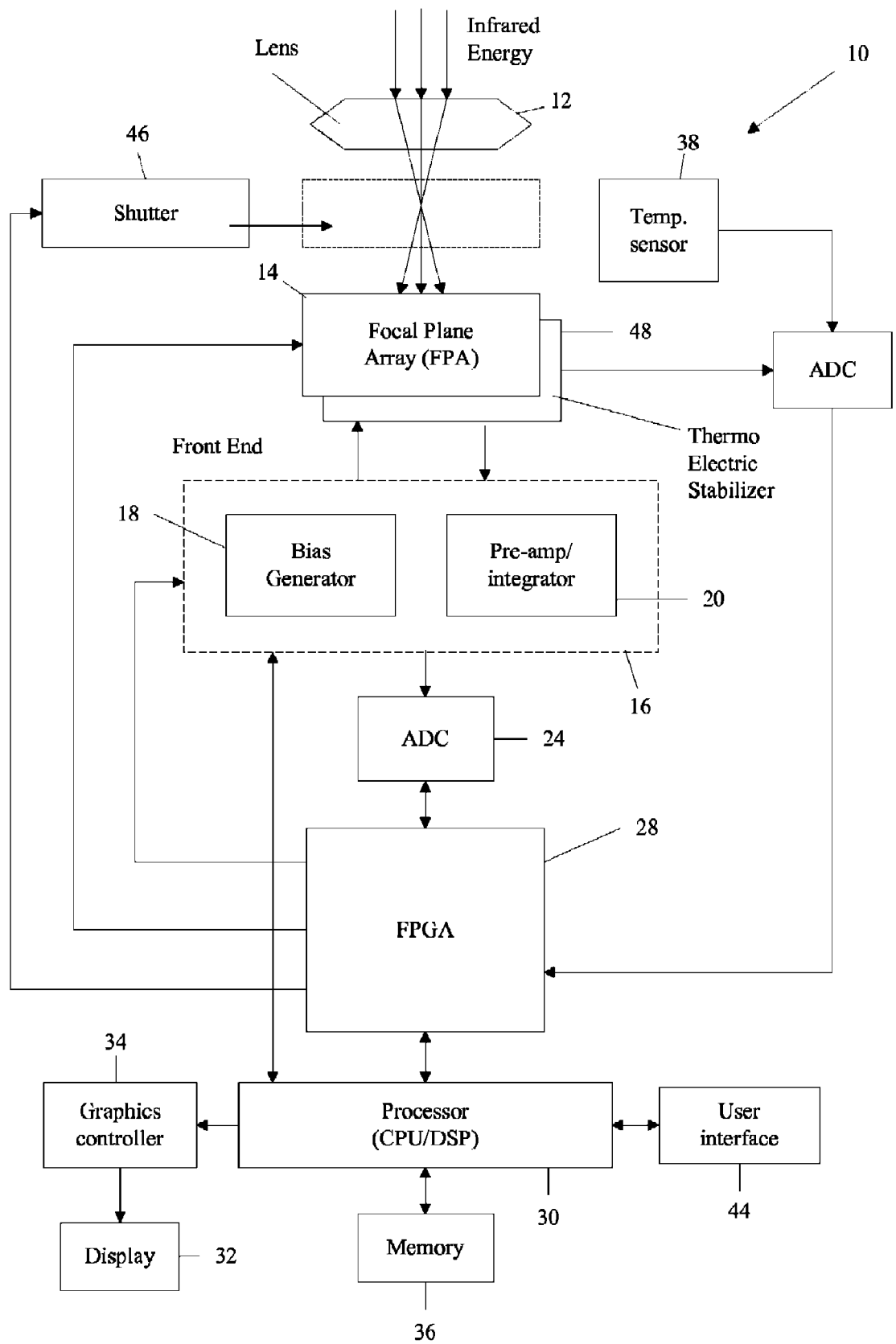
FIG. 1 is a block diagram representation of an exemplary infrared imaging system in accordance with certain embodiments of the invention.

FIG. 1 shows a block diagram representation of an exemplary infrared imaging system 10, with such system 10 having a lens 12 and an infrared focal plane array (FPA) 14. Typically, the system 10 would be at least partially housed within a camera to form a single unit. As described above, in operation, the system 10 receives image information in the form of infrared energy through the lens 12, and in turn, the lens 12 directs the infrared energy onto the FPA 14. The combined functioning of the lens 12 and FPA 14 enables further electronics within the imaging system 10 to create an image based on the image view captured by the lens 12.

The FPA 14 can include a plurality of infrared detector elements or pixels (not shown), e.g., including bolometers, photon detectors, or other suitable infrared detectors well known in the art, arranged in a grid pattern (e.g., an array of pixels arranged in horizontal rows and vertical columns). The size of the array can be provided as desired. For example, an array of 160×120 pixels can be employed, but the invention should not be limited to such. Further detailed description of the FPA 14 and its functioning is provided in patent application Ser. No. 11/553,373, entitled "Multiple View Infrared Imaging System", the disclosure of which is incorporated by reference herein in relevant part.

The signals generated by the FPA 14 are initially conditioned by a front-end stage 16 of the imaging system 10. In certain embodiments, as shown, the front-end stage 16 includes a bias generator 18 and a pre-amp/integrator 20. In addition to providing the detector bias, the bias generator 18 can optionally subtract an average bias current from the total current generated for each switched-in detector element. The average bias current can be subtracted in order (i) to compensate for deviations to the entire array of resistances of the detector elements resulting from changes in ambient temperatures inside the imaging system 10 and (ii) to compensate for array-to-array variations in the average detector elements of the FPA 14. Following provision of the detector bias and optional subtraction of the average bias current, the signals are passed through the pre-amp/integrator 20. Typically, the pre-amp/integrator 20 is used to condition incoming signals, e.g., prior to their digitization. As a result, the incoming signals can be adjusted to a form that enables more effective interpretation of the signals, and in turn, can lead to more effective resolution of the created image.

Subsequently, the conditioned signals are sent downstream into a back end of the circuit of the imaging system 10. Generally, the back end includes processing circuitry and optionally, one or more output elements. The output elements (one or more of a display 32 and memory 36) and their functioning (e.g., with respect to graphics controller 34) are described in detail in the above referenced patent application Ser. No. 11/553,373, the disclosure of which is incorporated by reference herein in relevant part.

The processing circuitry, in certain embodiments, can include one or more of a field-programmable gate array (FPGA) controller 28 and a processor 30 (e.g., computer processing unit (CPU) or digital signal processor (DSP)). In addition to providing needed processing for infrared imagery, as described above, it is well known that the processing circuitry can be employed for a wide variety of additional functions, e.g., involving temperature conversion (radiometry) for applications relating to automatic target detection and/or recognition for military, fire detection, intrusion alarms, fusion with data and/or imagery from other types of sensors, people counting, factory process automation, etc.

In certain embodiments, an ADC 24 is incorporated between the front end stage 16 and the processing circuitry; however, the invention should not be limited to such. For example, in certain embodiments, the ADC 24 could just as well be integrated with the front end stage 16, and optionally, integrated into a Read Out Integrated Circuit (ROIC) incorporated on the FPA 14. The signals conditioned by the bias generator 18 and pre-amp/integrator 20 are digitized via the ADC 24. In certain embodiments, the digitized thermal image signals are subsequently sent from the ADC 24 to the processor 30 via the controller 28. In turn, the processor 30 can process and send signals to one or more of the output elements. In certain embodiments, the processor 30 could send the signals directly to one or more of the output elements, or indirectly, e.g., via a radio downlink, network, internet, etc.

In certain embodiments involving bolometers as the infrared detector elements, if changes in ambient temperature cause the resistances of the detector elements of the FPA 14 to undesirably deviate, the output signal of the integrating portion of the pre-amp/integrator 20 may drop outside the readable range of the ADC 24. As such, the average current bias can be adjusted to ensure the output signals of the pre-amp/integrator 20 stay within the readable range of the ADC 24. For example, a temperature sensor 38 is located proximate to the FPA 14 and can measure temperature representative of the ambient temperature inside the imaging system 10. The temperature sensor 38 generates a temperature signal which is converted to a digital signal by an ADC 40 and provided to a timing control portion of the controller 28. In brief, the signals transmitted from the temperature sensor 38 via the ADC 40 and the controller 28 enable the processor 30 to determine whether the ambient temperature inside the imaging system 10, and proximate to the FPA 14, has changed, and if so, whether the average bias current may need to be adjusted. In certain embodiments, user interface 44 is electrically connected to the processor 30.

It should be appreciated that FIG. 1, illustrating the ADC 24, the controller 28, the processor 30, the display 32, the graphics controller 34, the memory 36, and the user interface 44 as separate components, is but one certain embodiment of the invention. In turn, such embodiment is not meant to limit the invention to such. It should be appreciated that any combination of these components can just as well be integrated into a single component (e.g., involving one integrated circuit chip set) without departing from the spirit of the invention.

As described above, offset compensation is performed to block external infrared energy from reaching the FPA 14, thereby providing the FPA 14 with a uniform infrared energy scene (i.e., via a shutter 46 being closed). Other well-known methods and techniques (e.g., defocused optics via a known automatic lens focusing system) could be substituted, however. As such, the offset corrections (e.g., the average bias current) for each infrared detector element are measured and adjusted via the bias generator 18 until the average output signal of the pre-amp/integrator 20 is at an appropriate level within the readable range of the ADC 24. Subsequently, the offset corrections are stored within the controller 28 and/or the processor 30, and optionally, the bias generator 18, to be later applied to the output of each infrared detector element of the FPA 14 during normal operation.

In certain embodiments, upon a determination that offset compensation is to be performed, the processor 30 communicates with the timing control portion of the controller 28. Subsequently, the controller 28 can generate the necessary signal(s) to cause the shutter 46 to be positioned in the closed position (i.e., placed between the lens 12 and the FPA 14, as indicated by dashed lines) to initiate the offset compensation.

As briefly described above, many embodiments of the invention involve directly monitoring the FPA 14 of the imaging system 10 to control scheduling of actuation of the shutter 46 through which offset compensation is performed. This monitoring of the FPA 14 automatically occurs during normal operation of the imaging system 10 (i.e., begins when the system 10 is powered on and continues until the system 10 is powered off). As further detailed below, in directly monitoring the FPA 14, the drift over time or a rate of change can be calculated by using pixel data from the FPA 14 from both a present measuring time and a previous measuring time in order to predict when the camera should initiate a subsequent offset compensation. As should be appreciated, the drift calculated from the pixel data is highly correlated to the "stray" radiation seen by the FPA 14 from the internal components of the system 10, which in turn is the source of the image quality and accuracy problems (e.g., caused during powering of the system 10 and sudden change in the surrounding ambient temperature). Using the calculated drift and relating it to a threshold pixel level for the FPA 14, certain embodiments of the invention predict the desired period for the next actuation of the shutter 46, as further detailed below. In general, when the drift is calculated to be large, the actuation period for the shutter 46 is correspondingly predicted to be short. Conversely, when the drift is calculated to be small, the actuation period for the shutter 46 is correspondingly predicted to be long.

As described above, using drift of pixel data from the FPA 14 in determining actuation scheduling of the shutter 46 has been found to be a useful technique in eliminating the "stray" radiation seen by the FPA 14 from the internal components of the system 10. This "stray" radiation, as described above, accounts for the drift of the FPA 14, and thus, is a source of the image quality and accuracy problems of the system 10.

In monitoring the rate of change with respect to the pixel data output of the FPA 14, the "stray" radiation can be measured thermally, electrically, and optically. Some sources of the "stray" radiation, and in turn, measured drift of the FPA 14, stem from ambient temperature (e.g., radiation stemming from internal components of the system 10, such as the shutter 46), electronics (e.g., electrical feedback stemming from other internal components of the system 10 that are electrically connected to the FPA 14), and the Thermo-Electric Stabilizer (TE Stabilizer) 48.

In certain embodiments, as shown, the TE Stabilizer 48 is coupled to the FPA 14 and is used to monitor and maintain the temperature of the FPA 14 at a certain desirable value (e.g., 30° C.). Following the imaging system 10 being powered, the TE Stabilizer 48 measures a temperature representative of the FPA 14 temperature. The TE Stabilizer 48 drive electronics send a voltage corresponding to the TE Stabilizer current that the processor 30 then monitors for stability purposes. In brief, the signals transmitted from the TE Stabilizer 48 via the ADC 40 and the controller 28 enable the processor 30 to determine whether the circuit of the TE Stabilizer 48 is stable. However, when the infrared imaging system 10 is powered, the TE Stabilizer 48 is generally found to produce drift, as described above, due to drift in the electronics that drive the TE Stabilizer 48. Through the electrical connection between the TE Stabilizer 48 and the FPA 14, the drift of the TE Stabilizer 48, producing "stray" radiation, can be detected by the FPA 14.

Figure 2:
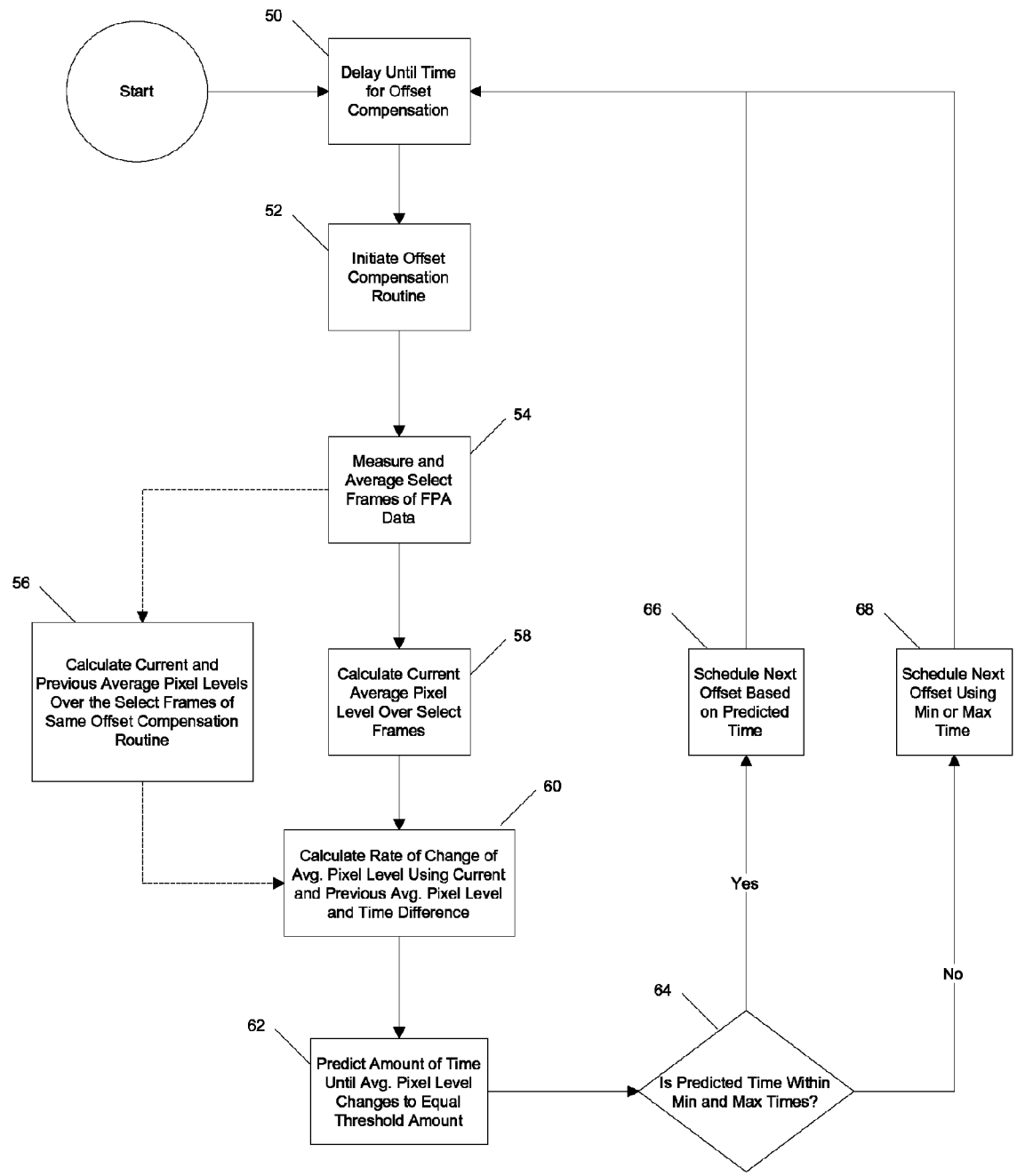
FIG. 2 is a flowchart depicting steps of an offset compensation scheduling algorithm of the infrared imaging system of FIG. 1 in accordance with certain embodiments of the invention.

FIG. 2 is a flowchart depicting exemplary steps of the offset compensation scheduling algorithm of the infrared imaging system 10. In certain embodiments, the scheduling algorithm is programmed in the processor 30, which is electrically connected to the FPA 14 via the controller 28. After the process starts, Step 50 involves one of two cases—either the imaging system 10 has just been powered and offset compensation is first initiated or the imaging system 10 has been operating and the actuation period for the shutter 46 has been calculated from a previous offset compensation. In the former case, there would only a momentary delay (as no shutter actuation period had been predicted yet); thus, the processor 30 would proceed to step 52. In the latter case, the processor 30 would wait until the actuation period for the shutter 46 from the previous offset compensation expired and then proceed to step 52.

Step 52 involves initiation of the offset compensation routine. As such, the processor 30 would direct the shutter 46 to its closed position (i.e., shown in dashed lines between the lens 12 and the FPA 14 in FIG. 1) so to initiate the routine. Step 54 involves measurement and averaging of select frames of the pixel levels of the FPA 14 while the shutter 46 is in the closed position. During offset compensation, the shutter 46 is held in the closed position for a certain length of time. In certain embodiments, the length of time can be about 1 second; however, the time length can be chosen as desired. Over the length of time, a plurality of image frames is captured by the pixels of the FPA 14. In certain embodiments, the plurality of image frames can be about 32 image frames; however, the quantity of image frames can be chosen as desired. Measurement and averaging of the select image frames of pixel levels of the FPA 14 is performed by the processor 30. In certain embodiments, the averaging for each select image frame can involve adding the output voltages from the pixels (obtained via the resistances of the pixels) and then dividing that sum by the total number of pixels.

With respect to choosing the select image frames, reference is made again to the two cases discussed in step 50. If the imaging system 10 has just been powered prior to step 50 (in which offset compensation is being first initiated), the processor 30 proceeds to step 56 where two select image frames are chosen from which pixel levels were measured and averaged from the current offset compensation routine. In certain embodiments, the two selected image frames can be the first and last measured and averaged image frames of the current offset compensation routine; however, the two selected frames can be chosen as desired. In turn, the first of the select image frames measured and averaged is referenced as the previous average pixel level and the second of the select image frames measured and averaged is referenced as the current average pixel level. As briefly described above, this is necessitated because this offset compensation represents the first provided from which average pixel levels are being stored; as such, both a previous and current value must be ascertained to calculate a rate of change between the two (in step 60).

Conversely, at step 54, if the imaging system 10 has been operating (so that there had been previous offset compensations), then the processor 30 proceeds to select a plurality of the image frames from which pixel levels were measured and averaged from the current offset compensation routine. In some embodiments, the processor selects all 32 frames of data captured while the shutter is closed. In other embodiments, only a subset of these 32 frames are used. In step 58, the selected image frames of measured and averaged pixel levels are then further calculated (e.g., averaged as described above) by the processor 30 to provide a current average pixel level over the current offset compensation routine.

Step 60 involves the processor 30 calculating a rate of change for the average pixel level using the current and previous average pixel levels and their corresponding time difference (e.g., the times at which both the previous and current average pixel levels were measured). In the case where the imaging system 10 has just been powered prior to step 50 (in which offset compensation is being first initiated), the previous and current average pixel levels are obtained from the current offset compensation routine (selected in step 56). In the case where the imaging system 10 has been operating (so that there had been previous offset compensations), the previous average pixel level is provided as the then-current average pixel level of the previous offset compensation routine, while the current average pixel level is provided as the current average pixel level in the current offset compensation routine (calculated in step 58).

Step 62 involves the processor 30 predicting the amount of time until the current average pixel level changes by a certain threshold level for the FPA 14. The change (i.e., delta) threshold for the average pixel level for the FPA 14 is preset within the processor 30 during a calibration of the camera such that the change equals a certain temperature change (e.g., 2° C.). In certain embodiments, the change threshold for the average pixel level correlates to a desired maximum change in temperature before offset compensation. Thus, if the change threshold for the average pixel level is exceeded (either positively or negatively), the desired maximum change in temperature is also exceeded. In turn, the image quality of the imaging system 10 is believed to be adversely affected. Of course, it is desirable to stay within the change threshold for the average pixel level so as to fall below the desired maximum change in temperature.

Figure 3:
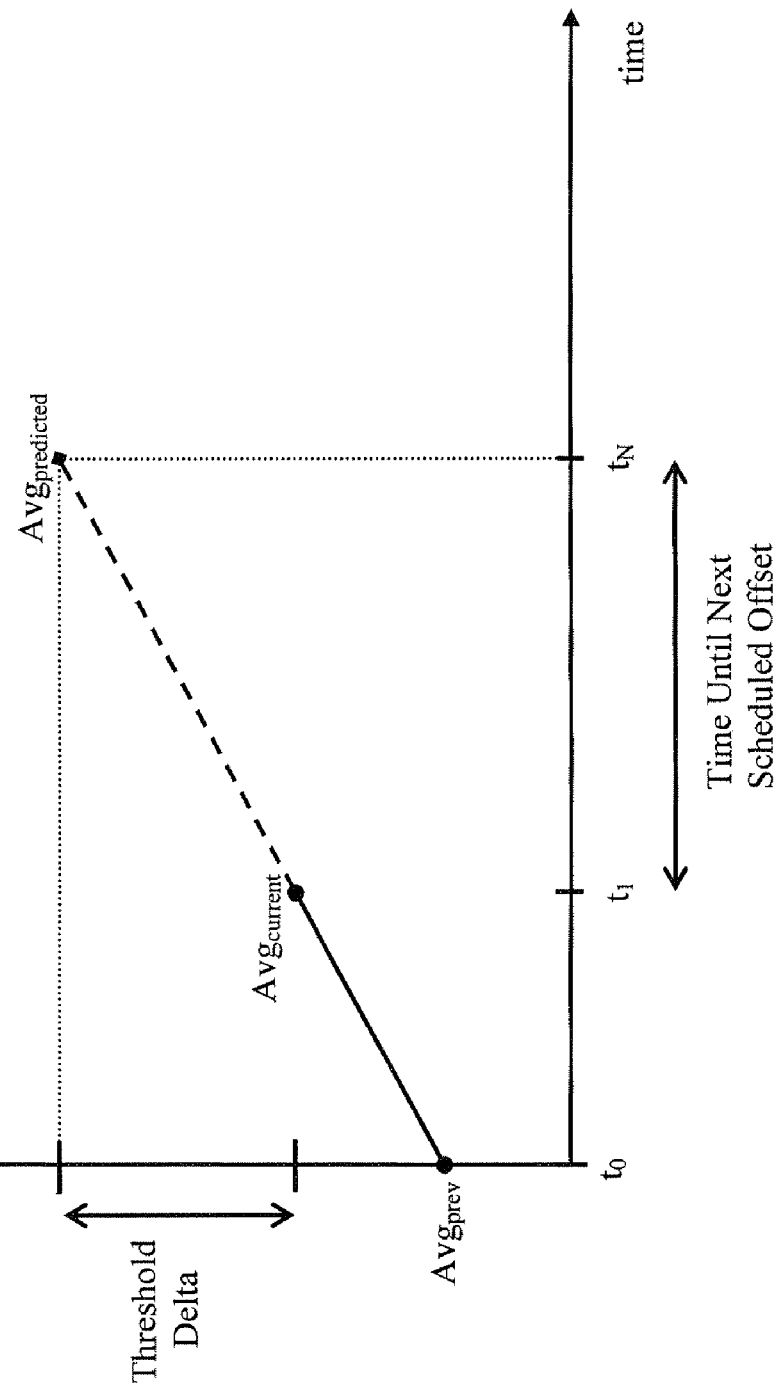
FIG. 3 is a graph exemplifying average pixel level versus time for select image frames of data from a focal plane array (FPA) of FIG. 1 in accordance with certain embodiments of the invention.

Steps 60 and 62 above are illustrated further with reference to FIG. 3. FIG. 3 is a graph exemplifying average pixel level versus time for select image frames of data from the FPA 14. As described above with respect to step 60, a rate of change for the average pixel level using the current and previous average pixel levels and their corresponding time difference is calculated. This is shown in FIG. 3, where the previous average pixel level, $Avg_{prev}$ is selected at time $t_0$, and the current average pixel level, $Avg_{current}$ is selected at time $t_1$. Using exemplary quantities for these variables, $Avg_{prev}$ is equal to 20 mV, $Avg_{current}$ is equal to 40 mV, $t_0$ is equal to 10 seconds, and $t_1$ is equals to 20 seconds, the drift over time or the rate of change calculated in step 60 is $$(Avg_{current} - Avg_{prev})/(t_1 - t_0), \quad (1)$$

or (40−20)/(20−10) equaling 2 mV/sec. The Threshold Delta Average on the y-axis (the change threshold for the average pixel level as referenced in step 62) represents the increase in average pixel level that $Avg_{current}$ would need to achieve to exceed the change threshold for the average pixel level. Using an exemplary quantity for this variable, Threshold Delta Average is equal to 200 mV. As described above with respect to step 62, the amount of time until $Avg_{current}$ is equal to the Threshold Delta Average for the FPA 14 is predicted. This amount of time would be equal to $t_N - t_1$. With the Threshold Delta Average being equal to 200 mV and the drift equaling 2 mV/sec, it would take 100 seconds for $Avg_{current}$ to achieve to exceed the change threshold for the average pixel level if the drift continues at its current rate. As such, the system predicts that the actuation period for the shutter 46 for the next offset compensation must be no greater than 100 seconds in order to maintain the image quality of the imaging system.

In certain embodiments, a pre-set range is provided for the actuation period of the shutter 46. As such, maximum and minimum times are selected, with range between the values being acceptable. In certain embodiments, the maximum time is 100 seconds and the minimum time is 10 seconds; however, the values can be selected as desired. In certain embodiments, step 64 involves the processor 30 determining whether the predicted amount of time (from step 62) is within the time lines. If the predicted time value is within the range, as exemplified above in discussing FIG. 3, the processor 30 in step 66 schedules the next offset compensation routine with the predicted time value being the actuation period of the shutter 46 for the routine. If the predicted time value falls outside the range, the value would be substituted by the processor 30 in step 68 with the corresponding maximum value or minimum value, depending on which side of the range the predicted value fell outside of. For example, if a predicted time value is higher than the maximum value, the processor in step 68 substitutes such value with the maximum value; conversely, if a predicted time value is lower than the minimum value, the processor 30 is step 68 substitutes such value with the minimum value. Following steps 66 and 68, the processor 30 loops back to step 50 and holds until the actuation period of the shutter 46 for the just-completed offset compensation routine elapses. In addition, after step 54, the processor 30 directs the shutter 46 to its open position (i.e., shown in solid lines in FIG. 1). In addition, the maximum value may change over time. For instance, upon initial power up of the imaging system, the maximum value may be the same as the minimum. The maximum value may then be slowly increased over time following power up until the maximum reaches a predetermined value.

Using two data points, the prediction of the time $(t_N - t_1)$ until the average pixel level ($Avg_{predicted}$) reaches the change threshold is based on a linear extension of the data $Avg_{prev}$ and $Avg_{current}$ data points. In alternate embodiments, measurement and analysis of drift over time may be performed using more than these two data points, $Avg_{prev}$ and $Avg_{current}$ used in steps 60 and 62 above. For instance, two or more previous averages may be retained and used via curve fitting or other mathematical techniques (e.g., polynomial regression) to predict the period of time it will take the average pixel level to change by the threshold amount, thereby reaching $Avg_{predicted}$.

In alternate embodiments, the prediction of the desired time for the next offset described in the embodiments above is combined with other automatic offset compensation triggering techniques. For instance, in one such alternate embodiment, imaging system 10 also uses measurements from one or more temperature sensors (e.g., temperature sensor 38, heat sunk pixel of FPA 14) to trigger offset compensations. In such an embodiment, measurement on one or more of such temperature sensors of a threshold temperature change since the last offset compensation would override the delay in step 50 to proceed directly to step 52 where an offset compensation would be initiated. In another such alternate embodiment, imaging system 10 tracks the period between offset compensations and increases the period after initial power up of the imaging system 10. In such an embodiment, the period setting would override the delay in step 50 to proceed directly to step 52 where offset would be initiated.

In other embodiments, the measurements taken on the one or more temperature sensors noted above (e.g., temperature sensor 38, heat sunk pixel of FPA 14) may be used in place of or in addition to the calculated average pixel levels used in steps 56 and 58. In such embodiments, the drift seen on the one or more temperature sensors may be used like the drift measured on the FPA to predict the amount of time until the anticipated drift is sufficient to warrant an offset compensation. That is, instead of or in addition to calculating the rate of change of the average pixel level, the rate of change of the one or more temperature sensors may be used to predict the desired time of the next offset compensation.

It will be appreciated the embodiments of the present invention can take many forms, and it is not intended that the embodiments of the invention presented herein should limit the scope thereof.

What is claimed is:

1. A method of scheduling offset compensation for an infrared (IR) imaging apparatus comprising:
   a) temporarily providing one or more generally uniform IR energy scenes onto a focal plane array (FPA) of the IR imaging apparatus, the FPA comprising a plurality of IR detector elements, each provision of the generally uniform IR energy scene being part of an offset compensation routine;
   b) measuring one or more outputs of the FPA from each of the one or more generally uniform IR energy scenes over time;
   c) determining a FPA output drift based on two or more of the FPA outputs; and
   d) scheduling a next offset compensation routine based on the drift.

2. The method of claim 1, wherein the one or more generally uniform IR energy scenes comprise two distinct generally uniform IR energy scenes.

3. The method of claim 2, wherein the one or more outputs of the FPA comprise one distinct output from each of the two distinct generally uniform IR energy scenes.

4. The method of claim 1, wherein the one or more generally uniform IR energy scenes comprise one generally uniform IR energy scene, and wherein the one or more outputs of the FPA comprise two outputs from the one generally uniform IR energy scene.

5. The method of claim 1, wherein each of the one or more distinct outputs of the FPA comprise averaged levels of one or more of the IR detector elements of the FPA over one or more image frames.

6. The method of claim 5, wherein the one or more of the IR detector elements of the FPA are used to form pixels of an IR image.

7. The method of claim 1, wherein the scheduling of the next offset compensation routine is based on a pre-determined threshold change in the output of the FPA.

8. The method of claim 7, wherein the pre-determined threshold change in the output of the FPA correlates to an approximate temperature change of the FPA.

9. The method of claim 1, further comprising triggering the next offset compensation routine.

10. The method of claim 9, wherein the triggering is based on the scheduling.

11. The method of claim 9, wherein the triggering is based on other measured parameters of the IR imaging system.

12. The method of claim 11, wherein one of the other measured parameters is a temperature measured by one or more sensors internal to the IR imaging system.

13. The method of claim 12, wherein the next offset compensation routine is triggered if the one of the sensors measures a predetermined change in temperature.

14. A computer-readable medium programmed with instructions for scheduling offset compensation for an infrared (IR) imaging system, the medium comprising instructions for causing a programmable processor to:
   a) receive measurements of one or more outputs of a focal plane array (FPA) temporarily exposed to one or more generally uniform IR energy scenes over time, the FPA comprising a plurality of IR detector elements, each exposure of the generally uniform IR energy scene being part of an offset compensation routine;
   b) determine an FPA output drift based on two or more of the FPA outputs; and
   c) schedule a next offset compensation routine based on the drift.

15. The computer-readable medium of claim 14, wherein the schedule of the next offset compensation routine is based on a pre-determined threshold change in the output of the FPA.

16. The computer-readable medium of claim 15, wherein the schedule includes predicting when the change in output of the FPA should equal the predetermined threshold change in the output of the FPA based on the drift over time.

17. The computer-readable medium of claim 15, wherein the schedule includes using a linear extension of the drift over time to determine the time when the change in the output of the FPA should equal the predetermined threshold change in the output of the FPA.

18. The computer-readable medium of claim 15, wherein the schedule is based on the drift and on the pre-determined threshold change in the output of the FPA if the next offset compensation routine is scheduled to be greater than a pre-determined a minimum time period.

19. The computer-readable medium of claim 15, wherein the schedule is based on the drift and on the pre-determined threshold change in the output of the FPA if the next offset compensation routine is scheduled to be less than a predetermined a maximum time period.

20. The computer-readable medium of claim 14, further comprising instructions for causing a programmable processor to pre-set one or more of a minimum time period and a maximum time period for the scheduling of the next offset compensation routine.

21. The computer-readable medium of claim 14, wherein the drift over time is a linear rate of change.

22. The computer-readable medium of claim 14, wherein the drift comprises a change in the FPA output attributable to one or more of thermal, electrical, and optical sources.

23. An infrared (IR) imaging apparatus comprising:
   a lens for focusing IR energy from a target scene;
   a focal plane array (FPA) paired with the lens adapted to receive the IR energy from the target scene via the lens, the FPA comprising a plurality of IR detector elements;
   means for temporarily exposing the FPA to one or more generally uniform IR energy scenes, each exposure of the generally uniform IR energy scene being part of an offset compensation routine;
   a processor operatively coupled to the FPA and for receiving measurements of one or more outputs of the FPA corresponding to each of the one or more generally uniform IR energy scenes over time, the processor determining an FPA output drift of two or more of the FPA outputs over time, and the processor using the drift to predict when the change in output of the FPA should equal a predetermined threshold change in the output of the FPA and scheduling a next offset compensation routine based on the prediction.

24. The apparatus of claim 23, wherein the means comprises a shutter, the shutter being temporarily positioned between the lens and the FPA to expose the FPA to the one or more generally uniform IR energy scenes.

25. The apparatus of claim 24, wherein the IR detector elements comprise bolometers.

26. The apparatus of claim 24, further including a temperature sensor located proximate to the FPA for measuring the temperature of the imaging apparatus, the processor operatively coupled to the temperature sensor and receiving the measured temperature, the processor determining whether a change in the measured temperature is adequate to trigger the next offset compensation routine ahead of the scheduled next offset compensation routine.

27. The apparatus of claim 23, wherein the IR imaging apparatus is housed within a camera to form a single unit.

28. The apparatus of claim 27, wherein the drift is attributable to one or more of thermal, electrical, and optical sources within the camera.

29. The apparatus of claim 27, wherein the drift is attributable to stray radiation within the camera.

* * * * *